(12) United States Patent
Farchtchian et al.

(10) Patent No.: US 8,556,448 B2
(45) Date of Patent: Oct. 15, 2013

(54) AIRFIELD LIGHTING DEVICE

(75) Inventors: Nadir Farchtchian, Berlin (DE); Holger Laabs, Berlin (DE); Rainer Seidel, Berline (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 526 days.

(21) Appl. No.: 12/809,593

(22) PCT Filed: Dec. 19, 2007

(86) PCT No.: PCT/EP2007/064254
§ 371 (c)(1),
(2), (4) Date: Jun. 20, 2010

(87) PCT Pub. No.: WO2009/077010
PCT Pub. Date: Jun. 25, 2009

(65) Prior Publication Data
US 2010/0277901 A1    Nov. 4, 2010

(51) Int. Cl.
*E01F 9/00* (2006.01)
(52) U.S. Cl.
USPC ............................. 362/153.1; 362/153
(58) Field of Classification Search
USPC ............................. 362/153, 153.1
See application file for complete search history.

(56) References Cited

U.S. PATENT DOCUMENTS

| | | | |
|---|---|---|---|
| 4,729,076 A | 3/1988 | Masami et al. | |
| 7,414,546 B2 * | 8/2008 | Singer et al. | 362/470 |
| 2005/0156531 A1 | 7/2005 | Young | |
| 2006/0250800 A1 | 11/2006 | Chang et al. | |
| 2007/0086196 A1 | 4/2007 | Wong | |
| 2007/0091622 A1 * | 4/2007 | Huang et al. | 362/373 |
| 2007/0189012 A1 * | 8/2007 | Huang et al. | 362/294 |
| 2007/0253202 A1 | 11/2007 | Wu et al. | |
| 2008/0116475 A1 * | 5/2008 | Chen | 257/99 |

FOREIGN PATENT DOCUMENTS

| | | |
|---|---|---|
| CN | 200952670 | 9/2007 |
| CN | 101078472 | 11/2007 |
| JP | 2001 266602 | 9/2001 |
| WO | WO 2007/019733 | 2/2007 |

* cited by examiner

*Primary Examiner* — William Carter
(74) *Attorney, Agent, or Firm* — Cozen O'Connor

(57) ABSTRACT

An airfield lighting device, comprising: at least one first light-emitting diode (LED) on a first base body; a first thermally conductive tube with a heat transmission medium; a first heat sink; and a housing, in which the first base body and the first thermally conductive tube are arranged. The first thermally conductive tube is thermally coupled to the first base body and to the first heat sink. The heat transmission medium can circulate in the first thermally conductive tube, such that heat which is produced by the at least one first LED during operation can be dissipated from the first base body to the first heat sink.

17 Claims, 3 Drawing Sheets

AIRFIELD LIGHTING DEVICE

RELATED APPLICATIONS

This is a U.S. national stage of application No. PCT/EP2007/064254 filed on Dec. 19, 2007.

FIELD OF THE INVENTION

The present invention is related to an airfield lighting device having at least one light-emitting diode.

BACKGROUND OF THE INVENTION

For aircraft take-offs and landings for example when it is dark and in fog, runways have so-called airfield lighting which, for example, can mark the side boundary, the center, the start and the end of the runways and taxiways, as well as individual sections. In this case, such lighting must comply with the official regulations and should be highly reliable with a long life.

SUMMARY OF THE INVENTION

At least one object of specific embodiments of the present invention is to specify an airfield lighting device having at least one light-emitting diode.

According to one embodiment, an airfield lighting device has, in particular:

- at least one first light-emitting diode (LED) on a first base body,
- a first thermally conductive tube with a heat transmission medium,
- a first heat sink, and
- a housing, in which the first base body and the first thermally conductive tube are arranged, wherein

- the first thermally conductive tube is thermally coupled to the first base body and to the first heat sink, and
- the heat transmission medium can circulate in the first thermally conductive tube, such that heat which is produced by the at least one first LED during operation can be dissipated from the first base body to the first heat sink.

Normally, halogen lamps or halogen reflector lamps are used to produce light in airfield lighting devices. These have a high operating temperature of several hundred ° C., and therefore a high thermal power loss. In comparison to halogen lamps, LEDs may have a considerably lower thermal power loss and at the same time a longer life, and may be more reliable. However, in order to achieve a long life for an LED such as the at least one first LED in the airfield lighting device described here, it is necessary for the temperature in layers of the LED which produce the light to be kept permanently below a critical limit in order to ensure that no premature degradation effects occur in the LED, which can shorten the life. By way of example, the boundary layer temperature in an LED must be kept below a temperature of 125° C., and preferably below a temperature of 90° C., for a continuous operation. While known heat sinks of the size of halogen reflector lamps are too small for efficient cooling and the dissipation of the heat produced by the at least one LED during operation via metal plates or by means of free convection to the housing is not efficient enough, the first thermally conductive tube allows efficient heat conduction from the first base body to the first heat sink of the heat which is produced by the at least one first LED during operation.

In this case, the at least one first LED can be arranged on the first base body such that the at least one first LED makes thermal contact with the first base body. The heat produced during operation of the at least one first LED can in this case be transferred to the first base body via a contact surface with said first base body. The thermal contact between the first base body and the first thermally conductive tube furthermore allows the heat to be transferred to the first thermally conductive tube. In this case, the first thermally conductive tube may have a first subarea and a second subarea, such that heat can be transported from the first subarea to the second subarea by means of the heat transmission medium. The first subarea and the second subarea are particularly preferably mutually opposite sides or ends of the thermally conductive tube. In this case, the first subarea may make thermal contact with the first base body, while the second subarea can make thermal contact with the first heat sink. The first thermally conductive tube can furthermore have an internal volume which is completely surrounded by an outer wall and in which the heat transmission medium is located.

The first subarea can preferably be arranged at a first end of the thermally conductive tube. The first thermally conductive tube may, in particular, be suitable for emitting heat in the first subarea, that is to say thermal energy, from the at least one first LED to the heat transmission medium. In this case, the heat transmission medium in the first subarea can change at least partially from a first state to a second state, wherein the first state and the second state may, for example, be different aggregate states. In particular, the first state may comprise a solid and/or a liquid phase, and the second state may comprise a vapor phase. In particular, this can mean that the heat transmission medium can vaporize or sublimate in the first subarea by absorption of heat from the heat source. In this case, the heat transmission medium may have a first vapor pressure in the first subarea. Alternatively or additionally, the first state may likewise comprise a vapor phase, in which case the density of the second state can then preferably be lower than the density of the vapor phase in the first state.

At least a portion of the heat transmission medium, which is in the second state in the first subarea after absorption of heat, can then be moved to the second subarea, which is preferably arranged at a second end of the thermally conductive tube, for example by convection forces. In the second subarea, the heat transmission medium can change back from the second state to the first state again, by heat emission, that is to say for example it can condense or resublimate. In particular, it may also be possible for the heat transmission medium in the second subarea to have a second vapor pressure, which is lower than the first vapor pressure. The heat released by the transfer of the heat transmission medium can then be emitted from the second subarea to the environment, in particular to the first heat sink.

In particular, the functional principle described above can result in the first subarea being at a higher temperature than the second subarea.

The heat transmission medium in the first state in the second subarea can then, for example, be transported back to the first subarea by the action of one or more forces, for example by the force of gravity and/or by capillary forces. In particular, network structures, sintered structures, grooves or channels or combinations thereof, which are arranged in the internal volume or surrounding the internal volume in the thermally conductive tube, may be suitable for transporting the heat transmission medium from the second subarea to the first subarea by capillary forces.

By way of example, the first thermally conductive tube which can conduct heat by means of the heat transmission medium according to the abovementioned principle may comprise or be a thermosyphon or, particularly preferably, a so-called heat pipe. A thermally conductive tube such as this operating on the abovementioned principle may be advantageous for passing heat efficiently from its first subarea to its second subarea economically, without consumption of additional energy. In particular, the airfield lighting device may have a heat pipe as the first thermally conductive tube. In this case, for efficient heat conduction by means of the heat transmission medium, this airfield lighting device may have an installation orientation, which is required for operation, in relation to the force of gravity direction, and/or in relation to the direction in which the airfield extends. In particular, this can mean that the first thermally conductive tube, when the airfield lighting device is installed in this way, leads horizontally from the first base body to the first heat sink.

The first thermally conductive tube may have an elongated shape, in the form of a rod. In particular, the first thermally conductive tube may in this case have a circular cross section at right angles to a longitudinal axis. The first subarea and the second subarea of the first thermally conductive tube may in this case advantageously be formed by the end areas of the shape in the form of a rod. Alternatively or additionally, the first thermally conductive tube may also have an elliptical cross section or a polygonal cross section with n sides, where n may be an integer greater than or equal to 3. Furthermore, the first thermally conductive tube may also have a plurality of internal volumes, which are formed separately from one another, with the heat transmission medium. It may also be possible for the first thermally conductive tube to have a plurality of thermally conductive tubes which can make thermal contact with the first base body and the first heat sink independently of one another, or else may be integrated in a common component, for example as two thermally conductive tubes which are in the form of rods and are connected along their length. Furthermore, the first thermally conductive tube may have an elongated shape or else a shape which is bent at least in subareas.

The fact that the first thermally conductive tube is thermally coupled to the first base body and to the first heat sink can therefore mean, in particular, that the first subarea of the first thermally conductive tube makes thermal contact with the first base body and therefore also with the at least one first LED which is arranged on the first base body, and the second subarea of the first thermally conductive tube makes contact with the first heat sink.

In this case, a thermal contact such as this or a thermal coupling can be provided by a mechanical contact, for example via contact surfaces or contact areas in each case on the first thermally conductive tube, the first base body and the first heat sink. In particular, the first base body and/or the first heat sink may in this case have, for example, a hole, groove or opening as contact surfaces, into which the first thermally conductive tube can partially project, and/or in which the first thermally conductive tube can partially run. In this case, furthermore, the thermal coupling between contact surfaces or contact areas can furthermore be improved by a connecting medium which conducts heat, for example a thermally conductive paste, which is applied to contact surfaces or contact areas, and/or a soldered joint with a solder.

The first thermally conductive tube can in each case be connected to the first base body and/or to the first heat sink by means of a detachable form of attachment. In this case, a detachable form of attachment may, in particular, be a mechanical type of attachment such as screws, plugs, flanges, clamps or a combination thereof. Furthermore, the first thermally conductive tube may be connected to the first base body and/or to the first heat sink by means of a form of attachment which can be detached only with difficulty after attachment or which is not detachable in normal conditions, such as soldering, welding, adhesive bonding or a combination thereof. The first thermally conductive tube can also be connected to the first base body and/or to the first heat sink by means of a combination of two or more types of attachment mentioned above, that is to say a combination of plugs, clamps, flanges, soldering, welding, adhesive bonding and/or screws.

The heat transmission medium may preferably have water. Alternatively or additionally, the heat transmission medium may have ethane, propane, butane, pentane, propene, methylamine, ammonium, methanol, ethanol, methylbenzene, acetone and/or carbon dioxide, or a mixture or combination thereof. By way of example, the heat transmission medium may have water and an antifreeze agent, for example an alcohol, as a result of which the first thermally conductive tube may also keep the heat transmission medium at least partially in the liquid phase below the freezing point of water.

Furthermore, there may be a lower pressure than the ambient air pressure in the internal volume, in comparison to the air pressure in the surrounding area outside the internal volume. Alternatively, there may also be a higher pressure than the ambient air pressure in the internal volume. A desired temperature range, within which the first thermally conductive tube can operate efficiently, can be set by setting the pressure in the internal volume, together with the choice of the heat transmission medium and the choice of the dimensions of the first thermally conductive tube, such as length, shape and diameter. In particular, official regulations for airfield lighting devices may actually require reliable and continuous operation in a temperature range from $-55°$ C. to $+55°$ C.

Furthermore, the first thermally conductive tube may have a material with high thermal conductivity, in particular a metal such as copper or aluminum. In particular, the first base body may also have a material of high thermal conductivity, in particular a metal such as copper or aluminum. Furthermore, the first base body may, for example, also have a metal core plate such as an aluminum core plate or may be such a core plate. In this case, the first base body may have mechanical and electrical contacts and contact surfaces such as a mounting surface or electrical conductor tracks, by means of which the at least one first LED can be mechanically and electrically connected.

Furthermore, the first heat sink may form at least a part of the housing in which the at least one first LED is arranged on the first base body. This can mean that the first heat sink may, for example, form a part of a housing wall which bounds the at least one first LED on the first base body from the area surrounding the airfield lighting device. This makes it possible to ensure efficient dissipation of the heat from the at least one LED via the first base body, the first thermally conductive tube and the first heat sink to the area surrounding the airfield lighting device.

The first heat sink may be formed and arranged circumferentially around the first base body. A first heat sink such as this can therefore be arranged in a space-saving manner around the first base body, such that a compact airfield lighting device can be made possible. In particular, the first heat sink may in this case surround the first base body, thus allowing uniform, symmetrical heat dissipation from the first heat sink to the area surrounding the airfield lighting device. By way of example, the first heat sink may be cylindrical with a circular, elliptical, triangular or polygonal cross section, or a combination thereof.

Furthermore, the first heat sink may have a material with a high thermal conductivity such as a metal, for example copper or aluminum. In particular, it may be advantageous for the first heat sink to have a high surface-area to volume ratio. In this context, the heat sink can preferably have grooves, cooling ribs, laminates and/or fins. By way of example, this allows heat to be emitted over a large area and efficiently to the surrounding area. For example, the first heat sink may have a plurality of grooves, cooling ribs, laminates and/or fins, circumferentially around the first base body, on an outer surface facing away from the first base body. Particularly if the first heat sink forms at least a part of a wall of the housing, the grooves, cooling ribs, laminates and/or fins may also be arranged on the outside of the housing, that is to say on the outside of the housing wall.

In addition to the first heat sink on the airfield lighting device, the first base body may itself have a second heat sink. In this case, the first base body may also be in the form of a second heat sink, on which the at least one first LED is arranged. The second heat sink can increase the dissipation of heat from the at least one first LED, in addition to the heat dissipation through the first thermally conductive tube and the first heat sink. Since the first base body and therefore also the second heat sink are arranged in the housing of the airfield lighting device, heat can be emitted into the interior of the housing from the at least one first LED via the second heat sink. This may be advantageous, for example, when the ambient temperature in which the airfield lighting device is arranged is so low that the heat transmission medium in the first thermally conductive tube when the at least one first LED is not in operation is entirely frozen, or is frozen at least to such a major extent that, immediately after starting up, the at least one first LED, the heat transmission medium cannot circulate or cannot circulate adequately in the thermally conductive tube in order to allow the heat produced by the at least one first LED to be efficiently dissipated to the first heat sink. The second heat sink then makes it possible to dissipate the heat produced by the at least one first LED into the interior of the housing, and thus to redistribute it such that the temperature in the housing and therefore also in the first thermally conductive tube can be raised above the ambient temperature, thus allowing the heat transmission medium to circulate adequately in the first thermally conductive tube again. Alternatively or additionally, a heating element for heating the first thermally conductive tube can be arranged in the housing, in order to heat the first thermally conductive tube to an operating temperature which is required for heat dissipation. For example, the operating temperature may be given by a melting temperature or boiling temperature of the heat transmission medium.

In the case of the airfield lighting device described here, it may be possible that the electrical power of the at least one LED need not be restricted as a result of a need to prevent the risk of overheating of the LED in the housing. In fact, it may be possible for the at least one first LED to have an electrical power of more than 20 watts. Particularly in the case of a high-power LED such as this, the heat dissipation described here by means of the first thermally conductive tube and the first heat sink may make it possible to achieve a long life for the airfield lighting device.

Furthermore, the at least one first LED may also comprise or be an LED array, which means an arrangement of a plurality of LEDs of the same or different types, on the first base body. The at least one LED or the LEDs in the LED array can preferably emit light in a visible wavelength range, and can therefore give the viewer the impression, for example, of a single-color, mixed-color or white-color light. Features of LEDs and LED arrays such as these are known to those skilled in the art, and will not be discussed any further here.

In addition to the at least one first LED and the first base body, the airfield lighting device may have at least one second LED on a second base body. Furthermore, the airfield lighting device may have a second thermally conductive tube, which is thermally coupled to the second base body and to the first heat sink and which has a heat transmission medium which can circulate in the second thermally conductive tube during operation of the at least one second LED. This allows the heat produced by the at least one second LED to be dissipated from the second base body to the first heat sink.

In this case, the second base body may have features such as those described in conjunction with the first base body. The second thermally conductive tube may have features such as those described in conjunction with the first thermally conductive tube. The at least one second LED may have features such as those described in conjunction with the at least one first LED.

In particular, the first base body and the second base body may be arranged in the housing such the at least one first LED and the at least one second LED can emit light in the same directions or in mutually different directions during operation.

BRIEF DESCRIPTION OF THE DRAWINGS

Further advantages as well as advantageous embodiments and developments of the airfield lighting device will become evident from the embodiments described in the following text, in conjunction with FIGS. 1 to 2B, in which.

DETAILED DESCRIPTION OF THE DRAWINGS

In the exemplary embodiments and figures, identical components or components having the same effect may in each case be provided with the same reference symbols. The illustrated elements and the relationships between the ratios of their sizes should in principle not be considered as being true to scale, and in fact individual elements such as layers, parts, components and areas may be illustrated with exaggeratedly thick or large dimensions in order to illustrate them better and/or for better understanding.

Figure 1:
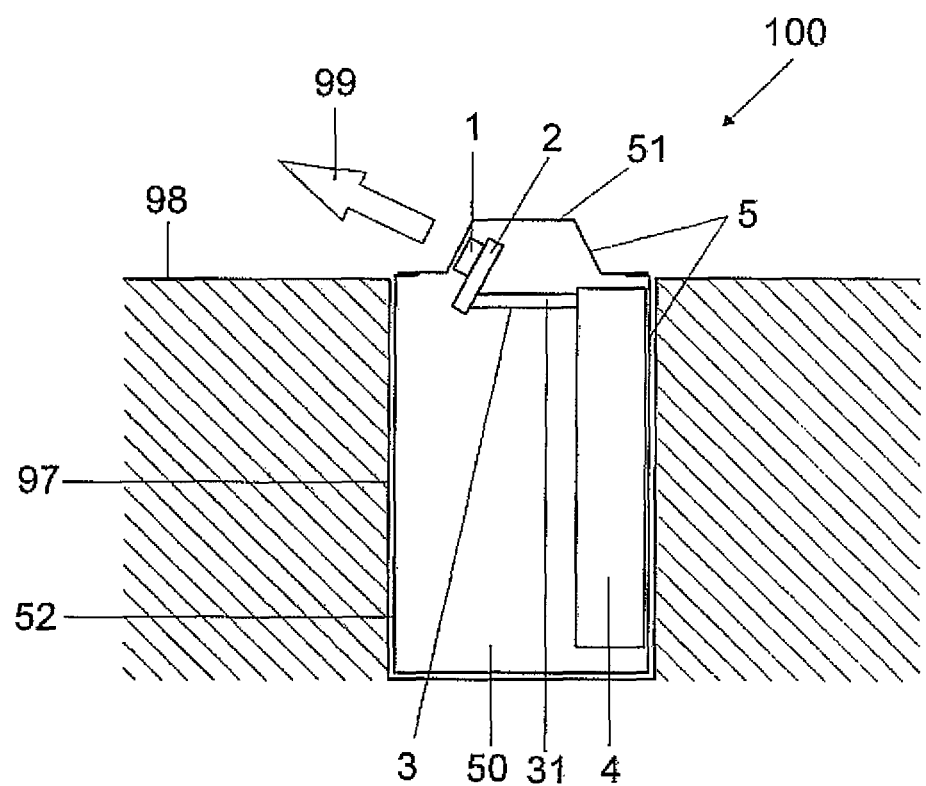
FIG. 1 shows a schematic illustration of an airfield lighting device according to one exemplary embodiment, and FIGS. 2A and B show schematic illustrations of an airfield lighting device according to a further exemplary embodiment.

FIG. 1 shows an exemplary embodiment for an airfield lighting device 100. This is arranged in a depression 97 on an airfield 98, that is to say for example a runway or a taxiway. A plurality of such airfield lighting devices 100 recessed in the ground may, for example, identify the edge boundaries or the center line of the airfield 98.

The airfield lighting device 100 has at least one first LED 1, which can emit light in the direction identified by the arrow 99. The at least one first LED may in this case emit light with an officially specified color and with an officially specified emission characteristic, depending on the form of the airfield 98. For example, airfield lighting devices at the edge of taxiways typically give a blue light impression, and those at the edge of the runways give a white light impression. Airfield lighting devices for center-line mapping, for example, may also give a white-colored light impression, a white and red-colored light impression or a red-colored light impression, depending on the position on a runway. In order to comply with the officially required brightness, the at least one first LED 1 has a power of more than 20 W. As an alternative to this, the at least one first LED 1 may also be in the form of an LED array, that is to say comprising a plurality of LEDS, which together have the required emission characteristic and brightness.

The at least one first LED 1 is arranged on a first base body 2, which is used as a mechanical mount and has electrical supply lines for the electrical connection of the at least one first LED 1. In the illustrated exemplary embodiment, the first base body 2 is in the form of an aluminum core plate, which makes thermal contact with the at least one first LED 1.

A first thermally conductive tube 3 with a heat transmission medium 31 in an internal volume of the first thermally conductive tube 3 makes thermal contact with the first base body 2 and with a first heat sink 4. In this case, the thermally conductive tube 3 is designed such that the heat transmission medium 31 can circulate in its internal volume and can dissipate to the first heat sink 4 heat which is created during operation of the at least one first LED 1.

Furthermore, the airfield lighting device 100 has a housing 5 which, in the illustrated exemplary embodiment, has a cover 51 and a lower part 52, which enclose a housing internal volume 50. The at least one first LED 1 is arranged on the first base body 2, and the first thermally conductive tube 3 is arranged within the housing 5. The first heat sink 4 is designed such that heat which is dissipated from the at least one first LED 1 by means of the first thermally conductive tube 3 to the first heat sink 4 can be emitted to the surrounding area, that is to say in the illustrated exemplary embodiment to the depression 97 in the airfield 98. For this purpose, the first heat sink 4 makes thermal contact with the wall of the lower part 52 of the housing 5.

Additionally, a heating element (not shown) can also be fitted in the housing interior volume 50, which is suitable for heating the first thermally conductive tube 3 to an operating temperature which is required for heat dissipation, as described in the general part above.

Further optical, electrical and mechanical components such as windows in the cover 51, lenses, electrical lines and components or mechanical holding apparatuses for the individual components described here are not shown, for the sake of clarity. However, these can additionally be arranged in the housing internal volume 50. Furthermore, for example, electrical supply lines and/or components such as transistors can be arranged in the depression 97 outside the housing 50, and can be passed into the airfield lighting device 100 via suitable plug connections and/or bushings (not shown).

As an alternative to the airfield lighting device 100 recessed in the ground in the exemplary embodiment as shown here, the airfield lighting device 100 may, for example, also be arranged on a supporting device, such as a post, above the airfield 98.

Figure 2A:
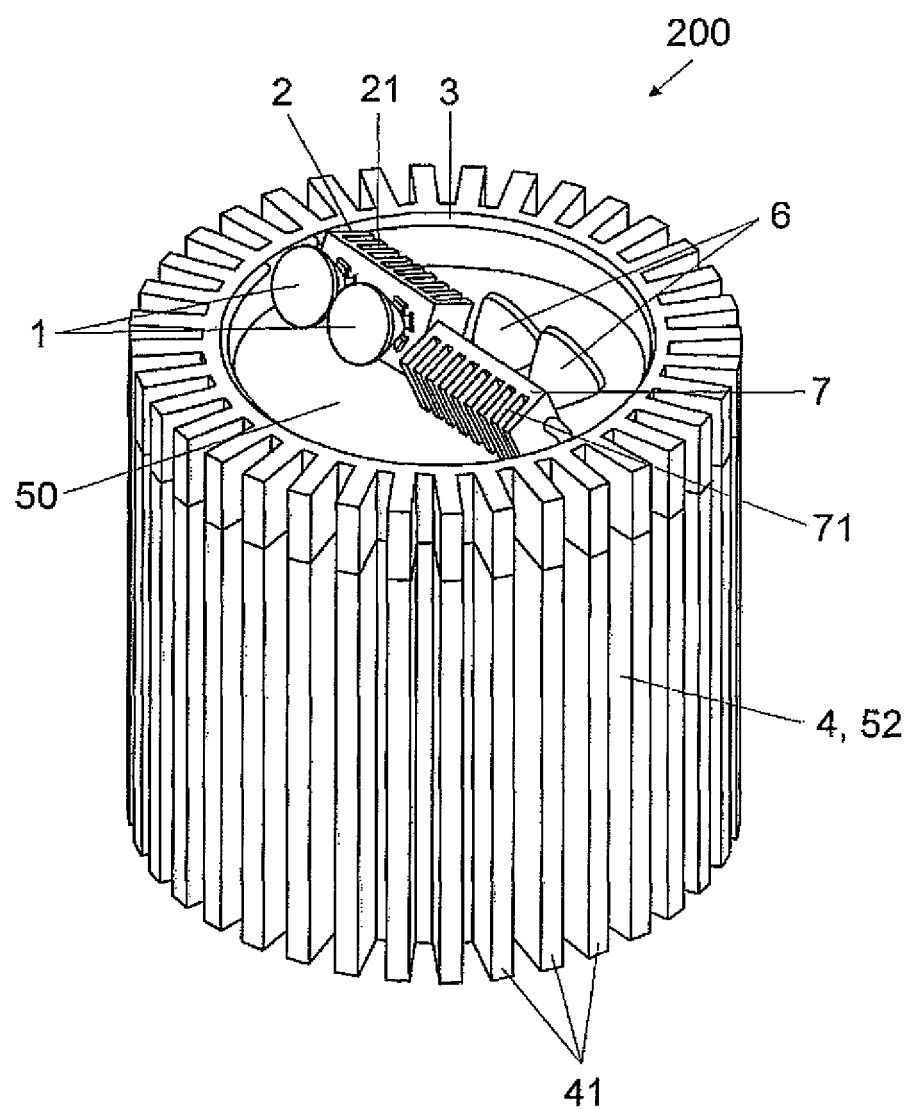
Figure 2B:
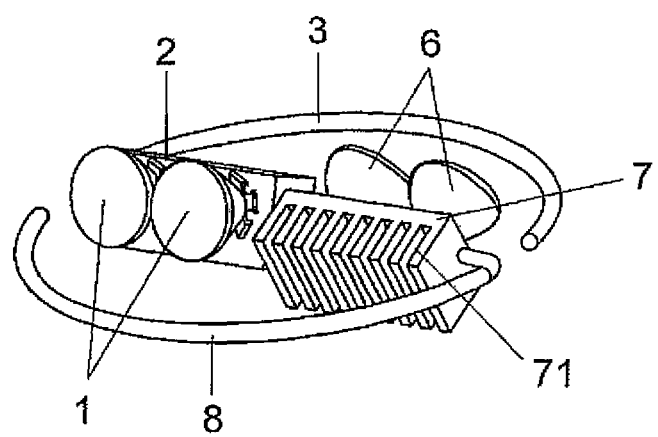

FIGS. 2A and 2B show schematic three-dimensional illustrations of a further exemplary embodiment 200 for an airfield lighting device, wherein FIG. 2A shows only the lower face 52 of the housing 5, in comparison to the airfield lighting device 100 shown in FIG. 1, while this illustration omits the cover 51, for sake of clarity. In comparison to FIG. 2A and in order to assist understanding, FIG. 2B shows only the components which are arranged within the housing 5 in FIG. 2A. The following description relates equally to both FIGS. 2A and 2B.

The airfield lighting device 200 has a heat sink 4 which is part of the lower face 52 of the housing. The heat sink 4 has a cylindrical shape and in this case surrounds a housing internal volume 50, in which a plurality of first LEDs 1 are arranged on a first base body 2, and a plurality of second LEDs 6 are arranged on a second base body 7. The plurality of first LEDs 1 and the plurality of second LEDs 6, of which in each case two LEDS are shown purely by way of example, in each case with an optical element for beamforming, are in this case arranged such that they emit light independently in mutually different directions.

The first base body 2 and the second base body 7 are each in the form of second heat sinks with cooling laminates 21 and 71, respectively, by which means the heat created by the respective LEDs 1 and LEDs 6 during operation can be at least partially dissipated into the housing internal volume 50, as described in the general part above.

A first thermally conductive tube 3 is thermally connected to the first base body 2, with one end of the first thermally conductive tube 3 being plugged into an opening in the first base body, and with the first thermally conductive tube 3 running away from the first base body 2 in a curved shape toward the first heat sink 4. For this purpose, the first thermally conductive tube 3 has a shape similar to a spiral, which is matched to the shape of the inside of the first heat sink 4 facing the first and second base bodies 2, 7. In this case, the first thermally conductive tube 3 is arranged circumferentially around the first base body 2, along an inner surface of the first heat sink 4. The first heat sink 4 additionally has a groove, in which the first thermally conductive tube 3 is arranged along approximately half the internal circumference of the first heat sink 4. This results in a large-area thermal contact between the first thermally conductive tube 3 and the first heat sink 4.

A second thermally conductive tube 8 is thermally connected to the second base body 7, with one end of the second thermally conductive tube 8 being plugged into an opening in the second base body 7, and with the second thermally conductive tube 8 having a shape similar to spiral, in the same way as the first thermally conductive tube 3, and likewise being arranged in a groove in the first heat sink 4. The first thermally conductive tube 3 therefore runs along the inner surface of the first heat sink 4 toward the second base body 7, while the second thermally conductive tube 8 runs along the inner surface of the first heat sink 4 toward the first base body 2. As can be seen in particular from FIG. 2B, this allows an extremely compact arrangement of the first and second base bodies 2, 7 and of the first and second thermally conductive tubes 3, 8 in the housing internal volume 50, while at the same time in each case allowing a large-area thermal contact between the thermally conductive tubes 3, 8 and the first heat sink 4.

In the illustrated exemplary embodiment as described further above, the thermally conductive tubes 3, 8 are heat pipes, which are arranged at the level of the LEDs 1, 6, or alternatively underneath them. When the airfield lighting device 200 is in the installed state, for example as shown in FIG. 1, the thermally conductive tubes 3, 8 run along the first heat sink 4 in the horizontal direction. In this case, "horizontal" is defined with respect to the force of gravity direction when the airfield lighting device 200 is in an installed state. This means that the installation orientation of the airfield lighting device 200 in the illustrated exemplary embodiment is such that the cylinder axis of the first heat sink 4 is parallel to the force of gravity direction, when in the installed state.

The heat sink has a plurality of cooling ribs 41 which run circumferentially around the base bodies 2, 7 on the outer surface facing away from the first and second base bodies 2, 7, that is to say on the outside of the housing. This allows large-area thermal coupling of the first heat sink 4 and therefore of the housing of the airfield lighting device 200 to the surrounding area, for example in a depression in an airfield as shown in FIG. 1. This makes it possible to ensure effective heat dissipation from the first heat sink 4 to the surrounding area. Alternatively or in addition to the illustrated vertical cooling ribs, the first heat sink 4 may also have cooling ribs or cooling laminates which are radially circumferential horizontally or inclined around the housing internal volume 50.

The description based on the exemplary embodiments, does not restrict the invention to these exemplary embodiments. In fact, the invention covers every novel feature and every combination of features, in particular including every combination of features in the patent claims, even if this feature or this combination is not itself explicitly mentioned in the patent claims or exemplary embodiments.

The invention claimed is:

1. An airfield lighting device, comprising:
    at least one first light-emitting diode (LED) on a first base body;
    a first thermally conductive tube with a heat transmission medium;
    a first heat sink; and
    a housing, in which the first base body and the first thermally conductive tube are arranged,
    wherein the first thermally conductive tube is thermally coupled to the first base body and to the first heat sink,
    wherein the heat transmission medium can circulate in the first thermally conductive tube, such that heat which is produced by the at least one first LED during operation can be dissipated from the first base body to the first heat sink, and
    wherein the first heat sink has an opening therein having a curved inner surface, and the first thermally conductive tube is bent in a curved shape against a portion of the curved inner surface of said opening.

2. The airfield lighting device as claimed in claim 1, wherein the first heat sink is at least part of the housing, and wherein the at least one first LED is arranged in the housing.

3. The airfield lighting device as claimed in claim 1, wherein the first heat sink is arranged circumferentially around the first base body.

4. The airfield lighting device as claimed in claim 1, wherein the first heat sink surrounds the first base body.

5. The airfield lighting device as claimed in claim 1, wherein the first heat sink cylindrically surrounds the first base body.

6. The airfield lighting device as claimed in claim 5, wherein the first heat sink has a plurality of cooling ribs, circumferentially around the first base body, on an outer surface facing away from the first base body.

7. The airfield lighting device as claimed in claim 1, wherein the first base body comprises a second heat sink.

8. The airfield lighting device as claimed in claim 1, wherein the first thermally conductive tube is plugged into an opening in the first base body.

9. The airfield lighting device as claimed in claim 1, wherein the airfield lighting device has an installation orientation, which is required for operation, in relation to a direction of a force of gravity, and
    wherein the first thermally conductive tube, when the airfield lighting device is installed according to the installation orientation in relation to the direction of the force of gravity, leads horizontally from the first base body to the first heat sink.

10. The airfield lighting device as claimed in claim 1, wherein the first thermally conductive tube leads away from the first base body according to the curved shape to the first heat sink.

11. The airfield lighting device as claimed in claim 1, wherein the first thermally conductive tube is arranged circumferentially around the first base body, along the curved inner surface of the first heat sink.

12. The airfield lighting device as claimed in claim 1, wherein the at least one first LED has an electrical power of more than 20 watts.

13. The airfield lighting device as claimed in claim 1, further comprising:
    at least one second light-emitting diode (LED) on a second base body; and
    a second thermally conductive tube with a second heat transmission medium,
    wherein the second thermally conductive tube is thermally coupled to the second base body and to the first heat sink, and
    wherein the second heat transmission medium can circulate in the second thermally conductive tube during operation of the at least one second LED, such that heat which is produced by the at least one second LED during operation can be dissipated from the second base body to the first heat sink.

14. The airfield lighting device as claimed in claim 13, wherein the at least one first LED and the at least one second LED emit light in mutually different directions during operation.

15. The airfield lighting device as claimed in claim 13, wherein the first heat sink cylindrically surrounds the first and second base bodies.

16. The airfield lighting device as claimed in claim 13, wherein the first thermally conductive tube runs according to the curved shape along the curved inner surface, which faces the first and the second base bodies, of the first heat sink to the second base body, and wherein the second thermally conductive tube runs in a second curved shape along the inner face of the first heat sink to the first base body.

17. The airfield lighting device as claimed in claim 1, further comprising a heating element for heating the first thermally conductive tube to an operating temperature which is required for heat dissipation.

* * * * *